United States Patent [19]

Kruder

[11] 4,112,519
[45] Sep. 5, 1978

[54] VENTED INJECTION MOLDING MACHINE AND METHOD

[75] Inventor: George A. Kruder, Marion, Ohio

[73] Assignee: HPM Corporation, Mount Gilead, Ohio

[21] Appl. No.: 703,440

[22] Filed: Jul. 8, 1976

[51] Int. Cl.² .......................... B29B 1/08; B29B 5/04
[52] U.S. Cl. .................................. 366/266; 366/323; 366/348; 425/73; 425/203; 425/812
[58] Field of Search ................. 259/191, 97; 425/203, 425/207, 815, 812, 73

[56] References Cited

U.S. PATENT DOCUMENTS

| 2,252,689 | 8/1941 | Bradshaw | 425/815 |
| 2,692,405 | 10/1954 | Gayler | 425/815 X |
| 3,263,276 | 8/1966 | Maier | 425/203 |
| 3,712,594 | 1/1973 | Schippers et al. | 259/191 |
| 3,737,151 | 6/1973 | Schaeffer et al. | 259/191 |
| 3,826,477 | 7/1974 | Kunogi et al. | 259/191 |
| 3,879,155 | 4/1975 | Hendru | 425/203 X |
| 3,963,558 | 6/1976 | Skidmore | 425/203 X |
| 3,992,500 | 11/1976 | Kruder et al. | 425/203 X |

Primary Examiner—Billy S. Taylor
Attorney, Agent, or Firm—Burns, Doane, Swecker & Mathis

[57] ABSTRACT

Injection molding apparatus is disclosed for molding degradable synthetic resinous materials such as nylons. A vented injection molding machine includes a barrel, a rotatable reciprocable screw and means for preventing ingestion of a deleterious atmospheric gas such as oxygen. The particular apparatus whereby exclusion of the atmospheric gas may be effected includes a conduit having a terminal end thereof positioned at the vent opening of the injection molding machine barrel. The conduit communicates with a source of inert gas and directs a pressurized current of inert gas into the vent opening during the transient time interval between the end of the injection portion of the molding machine cycle and the plasticization portion of the machine cycle. If desired, the inert gas may flood the vent opening continuously. Both nitrogen and carbon dioxide are suitable inert gases for use with nylon materials.

9 Claims, 2 Drawing Figures

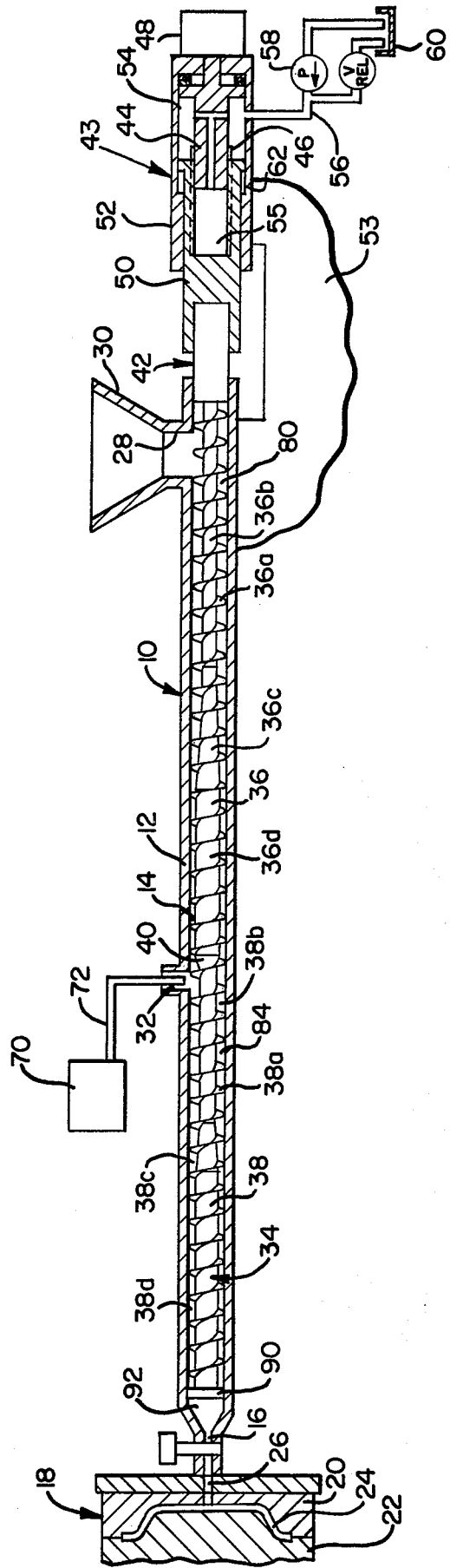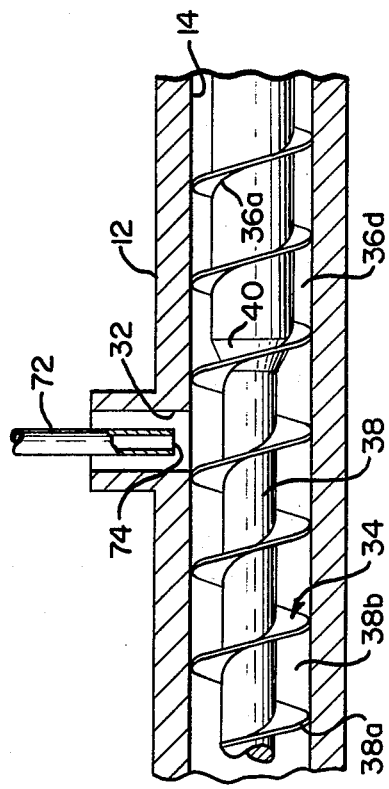

VENTED INJECTION MOLDING MACHINE AND METHOD

BACKGROUND OF THE INVENTION

This invention concerns methods and apparatus for injection molding of synthetic resinous material. More particularly, the present invention is concerned with vented injection molding of degradable synthetic resinous materials without predrying.

In the past, injection molding of hygroscopic synthetic resinous materials was frequently preceded by drying of the particulate feed material. The drying is effected by placing a batch of the particulate feed material in suitable drying apparatus and causing warm dry gas to circulate around the particulate material. Circulation of the warm dry gas removes moisture and lowers the water content of the feed material. The dried material is then fed into injection molding machine where it is plasticized, pressurized and formed into a useful product.

The predrying of hygroscopic material, however, is time consuming since it adds an additional step to the injection molding process and ordinarily proceeds as a batch type process. Moreover, the temperature of the heated gas which circulates through and around the particulate material must be maintained at a sufficiently low level that the synthetic particulate material does not become molten or tacky. Even with the constraint on the available drying gas temperature level, the predrying apparatus may cause some discoloration of the material when dealing with a material such as nylon.

In addition to the foregoing, the expense of a separate predrying step is also significant in the injection molding or articles. For example, the predrying apparatus requires floor space in addition to that required by the injection molding machine and involves additional labor costs in order to handle the individual batches of feed material.

An alternative to the separate predrying apparatus in combination with an injection molding machine has been suggested. The alternative comprises an injection molding machine having a barrel that is provided with a vent through which steam and other devolatilized gaseous products are exhausted from the inside of the barrel to the ambient atmosphere or to suitable treatment apparatus. While a vented injection molding machine may be effective to restrict the amount of predrying required for some hygroscopic synthetic resinous feed materials, it exhibits other difficulties when used in commercial production of articles fashioned from degradable materials such as nylons. More particularly, after many hours of continuous cyclic operation, known vented injection molding machines yield articles that include a multiplicity of black specs.

With continued production, the number of black specs increases and eventually the molded products are no longer suitable for commercial use. When this occurs, the injection molding machine must be disassembled to clean residue from the flights of the injection molding machine screw. The periodic disassembly and cleaning are expensive in terms of money and time and, therefore, are commercially undesirable.

Accordingly, the need continues to exist for a vented injection molding machine which is capable of continuously producing injection molded articles from synthetic resinous nylon materials without requiring the disassembly and cleaning of the injection molding machine at relatively frequent intervals.

SUMMARY OF THE INVENTION

To inhibit ingestion of a deleterious atmospheric gas such as oxygen, a conventional vented injection molding machine may be provided with exclusion means operatively associated with the barrel and vent opening to exclude the gas. The exclusion means preferably takes the form of flood means for bathing the vent opening with an inert gas.

The flood means is preferably operable during a time period which at least includes the transition from the injection portion of a molding cycle to the plasticizing portion of the molding cycle. In this manner, the period during which an atmospheric gas would be ingested is covered and the gas will be effectively excluded from deleterious effects.

To supply the inert gas, the flood means may include a conduit terminating at the vent opening and communicating with a pressurized source of inert gas. The inert gas is discharged from the conduit with a pressure and volumetric flow rate sufficiently high to feed the vent opening and have surplus available to flow out of the vent opening.

In applications where the inert gas is inexpensive or where there is great complexity in controlling the intermittent inert gas flow, the inert gas may be supplied to the vent opening in a continuous manner.

A suitable vented injection molding machine for use with the present invention may be provided with a barrel having a feed opening communicating with a longitudinally extending bore. The barrel is provided at one end with a discharge opening which may communicate with a suitable mold. Communicating with the bore intermediate the feed opening and the discharge opening is a suitable vent opening.

Rotatably and reciprocably disposed within the barrel bore is a two stage screw having a generally helical screw flight extending substantially along the entire length thereof. The first stage has a feed portion in general registry with the feed opening which is adapted to receive particulate material and advance it along the first stage. In cooperation with the barrel, the first stage plasticizes and masticates the synthetic resinous material to a moldable consistency.

When the plasticized material leaves the first pumping section, it passes into a vent portion disposed at the upstream end of the second stage. The vent portion is in registry with the vent opening. As the plasticized material enters the vent portion, gaseous volatiles including water vapor flash from the plasticized material into a free volume defined in the vent portion by the barrel bore and the helical channel of the second stage screw flight. The evolution of the gaseous volatiles including water vapor creates a pressure slightly above ambient pressure so that the volatiles exhaust themselves through the vent opening to the atmosphere or for further processing.

The second pumping stage advances the devolatilized plasticized synthetic resinous material through a second pumping portion to a cavity defined at the end of the screw wherein the material accumulates. The second pumping portion has a flow capacity exceeding the flow capacity of the first pumping portion to assist in curtailing the material bleed through the vent opening.

When a sufficient volume of material has been accumulated in the chamber, screw rotation is stopped, and the screw is advanced to force plasticized material out of the cavity through the discharge opening.

BRIEF DESCRIPTION OF THE DRAWINGS

Many objects of the present invention will be apparent to those skilled in the art when this specification is read in conjunction with the accompanying drawings wherein like reference numerals have been applied to like elements and wherein:

FIG. 1 is a view in partial cross section of an injection molding machine; and

FIG. 2 is an enlarged view in partial cross section of the vent opening illustrating one embodiment for creating an inert atmosphere at the vent opening.

DESCRIPTION OF THE PREFERRED EMBODIMENT

Turning now to FIG. 1, an injection molding machine 10 is depicted which includes a barrel 12 having a longitudinally extending screw receiving bore 14. At one end of the barrel 12 is a discharge opening 16 which communicates with the bore 14 and with a mold 18. The mold 18 includes a first mold portion 20 and a second mold portion 22 which are relatively movable and which cooperate to define a mold cavity 24. The mold cavity 24 communicates with the discharge openings 16 through a sprue 26.

At the other end of the barrel 12, remote from the discharge opening 16, is a feed opening 28. The feed opening 28 communicates with the screw receiving bore 14 and may be disposed in a generally vertical posture, as illustrated. Positioned externally of the bore 28 and mounted on the barrel 12 is a suitable hopper 30 through which particulate feed material is supplied to the screw receiving bore 14 for plasticization.

Positioned between the discharge opening 16 and the feed opening 28 is a vent opening 32 that also communicates with the bore 14. The vent opening 32 allows gaseous volatiles including water vapor to escape from the screw receiving bore 14. The vent opening 32, the feed opening 28 and the discharge opening 16 may have any suitable cross sectional shape including circular.

Disposed within the screw receiving bore 14 is a screw 34. The screw 34 includes a first stage 36 which extends from the feed opening 28 to a decreasing root diameter portion 40 at a position adjacent the vent opening 32 and a second stage 38 which extends from the downstream end of the first stage 36 to the end of the screw 34 adjacent the discharge opening 16.

The first stage 36 has a helical screw flight 36a extending along the length thereof which cooperates with the bore 14 to define a helical channel having a depth determined by the difference between the bore diameter and the corresponding screw root diameter. In registry with the feed opening 28, the first stage has a feed portion 36b that is operable to receive particulate feed material.

Downstream of the feed portion 36b is a transition portion 36c in which the depth of the helical channel decreases from a relatively large value in the feed portion 36B to a relatively small value in a first pumping portion 36d. The first pumping portion 36d is at the downstream end of the first stage 36 and has a first flow capacity defined by well known parameters (see, for example, Bernhardt, *Processing of Thermoplastic Materials*, Van Nostrand Reinhold Co. 1959).

The second stage 38 also includes a helical screw flight 38a extending along the length thereof. The first and second flights 36a, 38a may be continuous. Accordingly, the screw 34 may be considered to have a screw flight 36a, 38a extending substantially along its entire length within the bore 14.

At the upstream end of the second stage 38 is the short, decreasing root diameter portion 40 and a vent portion 38b which is in registry with the vent opening 32. The vent portion 38b has a root diameter which is smaller than that of the feed portion 36b so that the helical channel of the second stage 38 has a large flow capacity. In fact, the vent portion 38b is only partially filled during operation of the molding machine 10, so that an unfilled volume exists therein which communicates with the vent opening 32.

Downstream of the vent portion 38b is a relatively short transition portion 38c in which the depth of the helical channel decreases from a large value in the vent portion 38b to a comparatively small value in the second pumping portion 38d. The second pumping portion 38d has a greater flow capacity than does the first stage pumping portion 36d. In fact, the entire second stage 38 has a flow capacity exceeding the limited flow capacity of the first stage. In this manner, material will not accumulate in the second stage during steady state operation of the machine 10.

The screw 34 includes a portion 42 which protrudes from the barrel 12 at the end remote from the mold 18. The protruding screw portion 42 cooperates with apparatus 43 for rotating and reciprocating the screw within the screw receiving bore 14.

As part of the reciprocation apparatus, the screw 34 includes a piston end portion 50 which is reciprocably mounted within a suitable cylinder 52 that may be attached to the machine base 53. The cylinder 52 is divided into a first working chamber 54 and a second chamber 62 by the piston end portion 50. The first working chamber 54 receives pressurized hydraulic fluid through a conduit 56 from a pump 58 and a reservoir 60.

The screw rotating apparatus may comprise, for example, a driven shaft 44 having longitudinally extending teeth 46. The shaft 44 may be driven by a suitable conventional motor 48 mounted at the distal end of the cylinder 52. The teeth 46 are received in a conformingly shaped recess 55 in the piston 50 such that rotation of the shaft 44 is imparted to the piston 50 and the screw 34.

To prevent ingestion of oxygen through the vent opening 32, the injection molding machine is provided with an exclusion means operatively associated with the barrel 12 ad the vent opening 32 to inhibit the flow of atmospheric gases toward the vent opening 32. The exclusion means may include flood means to bathe the vent opening 32 with a suitable inert gas. When dealing with nylons, i.e., polyamides, either nitrogen or carbon dioxide are among the suitable inert gases that may be used. The particular inert gas selected would depend on the relative cost and availability of the various inert gases. The flood means may include, for example, a pressurized source 70 of a selected inert gas which may be positioned remotely from the barrel 12 or which may be mounted directly on the barrel 12, according to one's preference. The source of inert gas 70 communicates with the vent opening 32 through a conduit 72 which has a terminal end 74 (see FIG. 2) positioned within the vent opening 32.

The inert gas flows in the direction of the screw receiving bore 14 and has a pressure at least slightly above atmospheric, i.e., superatmospheric pressure. The inert gas is supplied at a flow rate sufficiently large that a surplus flow is always moving out of the vent opening 32, even when the machine 10 wants to ingest gases. This ingestive tendency of the machine occurs at the end of the injection portion of the molding cycle and the beginning of the plasticizing portion of the cycle.

For convenience in describing the operation of the injection molding machine, (FIG. 1) the injection molding machine cycle is described in terms of a plasticizing portion in which the screw 34 is rotating and an injection portion in which the screw 34 is not rotating. Thus, injection portion, as used herein, would encompass the injection stroke and the holding portion of many typical molding machine cycles.

The inert gas must be supplied to the vent opening during a time period covering an interval of transient operation during which gas ingestion may occur. This interval is bracketed between a first time immediately preceding inception of the plasticizing portion, and a second time just succeeding inception of steady flow conditions in the plasticizing portion. Depending on cost and availability of inert gas and the cost and complexity of an intermittent gas supply, the inert gas may be continuously flooded to the vent opening 32.

In operation, particulate feed material of a hygroscopic synthetic resinous material, such as nylon, is positioned in the hopper 30 (FIG. 1) for processing and molding into an article whose configuration is defined by the cavity 24 in the mold 18. During steady flow operation in the plasticizing portion, the particulate material drops into the first stage 36 of the screw 34 and enters the helical channel 80 of the feed section 36b defined by the bore 14 and the relatively deep screw flights 36a of the screw 34.

The material is accepted by the feed section 36b and, while the screw 34 is rotated by the rotary drive apparatus 44, 46, 48, the material is conveyed forwardly (to the left in FIG. 1) and into the transition section 36c of the first stage. In the first stage 36, the material is heated, compacted, masticated and plasticized while experiencing a shearing action between the screw flight 36a and the barrel bore 14. At the downstream end of the pumping portion 36d the material has a moldable consistency.

When dealing with nylon, the plasticized material may, for example, have a temperature in the neighborhood of 540° F. Accordingly, it will be apparent that any water or water vapor present in the particulate feed material will be vaporized and may result in vapor pockets in the plasticized material at the first pumping section 36d.

As the plasticized material passes through the portion 40, it enters the vent portion 38b of the second stage 38. The vent portion 38b has a relatively large cross-sectional area so that, at any given time, the helical channel 84 has a volume substantially larger than the volume of plasticized material passing therethrough from the first pumping portion 36d. Accordingly, the helical channel 84 is only partially filled. Since the vent portion 38b communicates with ambient air through the vent opening 32, the pressure existing in the vent portion 38b is substantially ambient pressure. As a result, the pressurized pockets of volatilized solvents, including water vapor, which are contained by the pressure upstream of the restrictor member 40, flash upon exposure to the large volume and relatively low pressure in the vented portion 38b. The released materials are exhausted through the vent opening 32. As the pockets are released, the plasticized material is dried and devolatilized.

The devolatilized and dried plasticized synthetic resinous material moves forwardly from the vent portion 38b where it is further worked to release additional pockets of entrained vapor. Next the material enters the short transition portion 38c from which it passes into the second pumping portion 38d. The material may be further heated as it progresses through the second stage by conventional heaters around the barrel 12. The flow capacity of the second stage 38 is greater than that of the first stage 36 and, therefore, the second stage is able to convey a larger volume of plasticized material toward the mold 18.

Positioned at the distal end of the screw 34 is a suitable conventional nonreturn valve 90 which allows the plasticized material to enter a cavity 92 defined by the bore 14, the discharge opening 16 and the distal end of the screw 34. The nonreturn valve 90 permits the plasticized material to enter the cavity 92 but prevents the flow of material from the cavity 92 upstream into the helical channel 84 of the second pumping portion 38d.

As the screw 34 rotates, material is continuously conveyed forwardly through the second pumping portion 38d and into the cavity 92. Simultaneously, the screw 34 translates rearwardly, to the right in FIG. 1, enlarging the volume of the cavity 92 to accommodate additional plasticized material. This enlargement of the cavity 92 occurs during the plasticization portion of the injection molding machine cycle. When a sufficient volume of material has been accumulated in the cavity 92 to fill the mold cavity 24, the plasticization portion of the cycle ends and the rotary drive apparatus stops rotation of the screw 34.

The injection portion of the cycle then begins and the first chamber 54 of the cylinder 52 is pressurized such that hydraulic pressure acting on the piston 50 causes the screw 34 to translate toward the left end of the screw receiving bore 14. As the screw 34 translates the volume of the cavity 92 decreases and the nonreturn valve 90 prevents material trapped in the cavity from flowing upstream into the helical channel 84 of the second stage 38.

Pressure develops in the cavity 92 as a result of the screw movement and causes plasticized material to pass outwardly through the discharge opening 16 into the sprue 26 and the mold cavity 24. The hydraulic pressure in the first chamber 54 may be maintained at a lower level after the mold cavity 24 has been filled to ensure that sufficient material is injected and to maintain the requisite dimensional tolerances. At the end of the transition portion of the cycle, the rotary drive apparatus begins to rotate the screw to accumulate a new charge of material. In addition, the article formed during the previous cycle is removed from the mold in a conventional manner.

During molding operations with nylon, small deposits of plasticized material occasionally hang up on the trailing edge of the screw flight 38a in the vent portion 38b of the second stage 38. Due to the high temperature of the injection molding machine and the presence of oxygen that enters the vent opening 32, these small deposits of plasticized material are oxidized causing them to turn black. In commercial production for extended operating periods, these small black deposits may become dislodged, are conveyed through the helical channel 84 and ultimately enter the mold 18. The black deposits thus become part of a molded article.

Even when a few black specs can be tolerated, extended periods of commercial operation permit the oxidation problem to become more and more acute. More particularly, after a period of several hours, the molded products become so contaminated by black specs that it is no longer possible to continue operation. Accordingly, the screw 34 must be removed from the injection molding machine 10 so that the oxidatively degraded deposits on the screw flight 38a can be scraped off and the screw 34 cleaned for subsequent production.

By use of the present invention it has been found that that continuous commercial production of injection molded nylon products can be effected without the need of cleaning of the injection molding machine screw at frequent intervals. The presence of the inert gas bath flowing into the vent opening 32 with a sufficient pressure and volmetric flow to prevent the ingestion of atmospheric air has been found to eliminate the oxidation problem discussed above.

Initially, the improvement resulting from the presence of the inert atmosphere was not fully understood. However, tests have been conducted to gain a better appreciation of the phenomena causing ingestion of oxygen in a vented injection molding machine.

To better understand the phenomena, it is observed that the plasticized material in helical channel 84 and the second pumping section 38d creates an hydraulic plug downstream of the vent opening 32. Moreover, a second hydraulic plug is effected by the plasticized material present in the helical channel of the first pumping section 36d at a position upstream of the vent opening 32. Accordingly, the vent portion 38b is hydraulically sealed with the exception of the vent opening 32.

As noted, during the plasticization portion of the cycle, material accumulates in the cavity 92 and develops a pressure causing the screw 34 to recede from the cavity. This pressure also causes a classical pressure flow of material in the helical channel 84 which opposes the classical drag flow generated by screw rotation. With a backpressure acting on the piston 50, a significant pressure level develops in the cavity 92 and causes the helical channel 84 to remain full for a substantial distance from the nonreturn valve 90 in the second pumping portion 38d.

As the backpressure, or cavity pressure, increase, the filled distance of the pumping portion 38d correspondingly increases. The filled distance determines the unfilled volume of the vent portion 38b and the transition portion 38c. In addition, the plasticized material remains in the second stage 38 when the injection portion of the molding cycle commences.

At inception of the plasticizing portion, the rotary drive apparatus rotates the screw 34. By virtue of the larger pumping capacity of the second pumping portion 38d, the plasticized material in the second pumping portion 38d is advanced into the cavity 92 and pressurized. The screw 34 also may commence to recede from the cavity 92. The foregoing may occur before the first pumping stage 36d is operating with steady flow conditions to provide a steady flow of plasticized material into the vent portion 38b. Accordingly, the unfilled volume of the vent portion 38b may temporarily increase causing ingestion of air through the vent opening 32. This volumetric increase occurs during a short time interval at the inception of the plasticizing portion.

To avoid ingestion of atmospheric air and oxygen which causes the oxidation discussed above, the vent conduit 72 may be used to bathe the vent opening 32 with an inert gas. From the preceding discussion it will be seen that the inert gas must be supplied during a time interval bracketed by a first time coinciding with the inception of the plasticizing portion and a second time coinciding with uniform flow conditions in the screw after inception of the plasticizing portion. The actual time interval during which the ingestion occurs has been observed to be on the order of one-half second.

Pressure measurements taken on a manometer attached to a vent opening 32 of a test injection molding machine have shown that a pressure of approximately one inch of water exists before inception of the transitory segment of the plasticizing portion. The pressure at the vent opening 32 becomes a vacuum of approximately one and one-half inches of water during the transitory segment.

In addition to the foregoing, it is believed that the heating which occurs in the first stage 36 directly releases some water vapor which passes to the right (FIG. 1) in the screw receiving bore 14 and out through the feed opening 28. In this manner, the flow of water vapor synergistically inhibits ingestion of atmospheric air through the feed opening 28.

With an injection molding machine manufactured in accordance with the present invention, it has been found that undried nylon particulate material, when molded, has an appearance which is brighter white and cleaner looking than the feed material. In addition, the feed material does not have to go through a predrying step thereby reducing both time and cost for production can be attained without the need to disassemble and clean the molding machine at frequent periodic intervals.

It should now be apparent that there has been provided in accordance with the present invention a novel vented injection molding machine which overcomes problems associated with prior art devices. Moreover, it will be apparent to those skilled in the art that numerous modifications, variations, substitutions and equivalents may be effected for features of the invention described above without departing from the scope of the invention. Accordingly, it is expressly intended that all such modifications, variations, substitutions and equivalents which fall within the spirit and scope of the invention as defined by the appended claims be embraced thereby.

What is claimed is:

1. In a vented injection molding machine operable during a plasticizing portion of a molding cycle to accept synthetic resinous material in particulate form and to plasticize the material to a moldable consistency and operable during an injection portion of the molding cycle to shape the plasticized material into a useful form, the machine having a barrel with a feed opening, a vent opening communicating with atmospheric pressure and a discharge opening, and a rotatable reciprocable screw with a vent section in the barrel, an improvement for avoiding degradation of the plasticized material in the barrel comprising:

exclusion means operatively positioned with respect to the barrel and the vent opening for inhibiting ingestion of deleterious atmospheric constituents so as to avoid contact of deleterious atmospheric constituents and plasticized material while permitting atmospheric pressure to prevail in the vent section; and, wherein the exclusion means includes flood means for bathing the vent opening with an inert gas from a first time preceding inception of the injection portion until a second time after inception of the injection portion of the molding cycle where the first time and the second time are selected to bracket the time period during which the machine experiences subatmospheric pressure.

2. The vented injection molding machine of claim 1 wherein the flood means includes a conduit terminating at the vent opening, the conduit communicating with a source of inert gas and operable to supply inert gas to the vent opening with a pressure greater than the ambient pressure.

3. The vented injection molding machine of claim 2 wherein the source of inert gas is a source of nitrogen.

4. The vented injection molding machine of claim 2 wherein the source of inert gas is a source of carbon dioxide.

5. The vented injection molding machine of claim 1 wherein flood means bathes the vent opening continuously during the plasticizing and injection portions of the molding machine cycle.

6. An injection molding machine cyclically operable through a plasticizing portion and an injection portion, operable during the plasticizing portion to accept particulate synthetic resinous material and plasticize it to a moldable consistency and operable during the injection portion to shape the plasticized material, comprising:
a barrel having a screw receiving bore, a feed opening communicating with the bore, a discharge opening at one end of the bore, and a vent opening communicating with the bore intermediate the feed opening and the discharge opening, the vent opening being in communication with atmospheric pressure;
a screw disposed in the screw receiving bore, having a first stage with a first flow capacity and communicating with the feed opening, and a second stage with a second flow capacity exceeding the first flow capacity and communicating with the vent opening and the discharge opening, the second stage including a vent section that registers with the vent opening;
rotary drive means connected to the screw for rotating the screw in the barrel during the plasticizing portion;
reciprocatory drive means connected to the screw and operable to advance the screw toward the discharge opening during the injection portion; and
means operatively positioned with respect to the barrel and the vent opening and operable to bathe the vent opening with gas and to inhibit ingestion of an atmospheric constituent gas during a time period at the inception of the injection portion when the vent section experiences subatmospheric pressure so as to avoid contact of the atmospheric constituent gas and plasticized material while maintaining communication of the vent opening with atmospheric pressure.

7. An injection molding machine cyclically operable through a plasticizing portion and an injection portion, operable during the plasticizing portion to accept particulate synthetic resinous material and plasticize it to a moldable consistency and operable during the injection portion to shape the plasticized material, comprising:
a barrel having a screw receiving bore, a feed opening communicating with the bore, a discharge opening at one end of the bore, and a vent opening communicating with the bore intermediate the feed opening and the discharge opening, the vent opening being in communication with atmospheric pressure;
a screw disposed in the screw receiving bore, having a first stage with a first flow capacity and communicating with the feed opening, and a second stage with a second flow capacity exceeding the first flow capacity and communicating with the vent opening and the discharge opening, the second stage including a vent section that registers with the vent opening; and
rotary drive means connected to the screw for rotating the screw in the barrel during the plasticizing portion;
reciprocatory drive means connected to the screw and operable to advance the screw toward the discharge opening during the injection portion;
exclusion means operatively positioned with respect to the barrel and the vent opening and operable to inhibit ingestion of an atmospheric constituent gas during a time period when the vent section experiences subatmospheric pressure so as to avoid contact of the atmospheric constituent gas and plasticized material while maintaining communication of the vent opening with atmospheric pressure; and
wherein the exclusion means includes flood means for bathing the vent opening with an inert gas from a first time preceding inception of the injection portion of the molding cycle to a second time succeeding inception of the injection portion where the first and second times are selected to bracket a time period during which the vent section experiences subatmospheric pressure.

8. The injection molding machine of claim 7 wherein the flood means includes a conduit, terminating at the vent opening, which supplies inert gas at superatmospheric pressure from the first time until the second time.

9. In a process of injection molding synthetic resinous material with a machine having a barrel and a rotatable reciprocable screw, wherein the synthetic resinous material is advanced through the barrel by rotation of the screw, worked by interaction of the barrel and the screw and periodically expelled from the barrel by bodily movement of the screw along the barrel, an improved method of drying and devolatilizing the synthetic resinous material comprising the steps of:
delivering worked synthetic resinous material to a vent zone;
allowing the synthetic resinous material to evolve water vapor and gaseous volatiles into the vent zone;
venting the water vapor and gaseous volatiles from the vent zone at essentially atmospheric pressure;
excluding air from the vent zone while maintaining atmospheric pressure in the vent zone;
conveying the synthetic resinous material from the vent zone for further working by the barrel and screw; and
wherein the excluding step includes the step of bathing a vent opening of the barrel, which opening communicates with the vent zone, with an inert gas.

* * * * *